US010257123B2

(12) United States Patent
Narayanan et al.

(10) Patent No.: US 10,257,123 B2
(45) Date of Patent: Apr. 9, 2019

(54) SOFTWARE-DEFINED-NETWORKING (SDN) ENABLING OPERATING-SYSTEM CONTAINERS FOR REAL-TIME APPLICATION TRAFFIC FLOW IMPROVEMENT

(71) Applicant: DELL PRODUCTS L.P., Round Rock, TX (US)

(72) Inventors: Rajesh Narayanan, San Jose, CA (US); Ke Xu, Vacaville, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 401 days.

(21) Appl. No.: 14/704,657

(22) Filed: May 5, 2015

(65) Prior Publication Data
US 2016/0330091 A1 Nov. 10, 2016

(51) Int. Cl.
*H04L 12/24* (2006.01)
*H04L 12/931* (2013.01)

(52) U.S. Cl.
CPC .......... *H04L 49/70* (2013.01); *H04L 41/0853* (2013.01); *H04L 41/12* (2013.01)

(58) Field of Classification Search
CPC ..... H04L 49/70; H04L 41/12; H04L 41/0853; H04L 43/06; H04L 43/04
USPC ........................................................ 709/224
See application file for complete search history.

(56) References Cited

U.S. PATENT DOCUMENTS

| | | | | |
|---|---|---|---|---|
| 9,547,518 B2* | 1/2017 | Higuchi | ............... | G06F 9/45558 |
| 9,552,225 B2* | 1/2017 | Pope | ........................ | G06F 9/468 |
| 9,608,932 B2* | 3/2017 | DeCusatis | ............... | H04L 47/70 |
| 2008/0155537 A1* | 6/2008 | Dinda | .................... | G06F 9/4887 |
| | | | | 718/1 |
| 2010/0185725 A1* | 7/2010 | Camarillo | ......... | H04L 29/06027 |
| | | | | 709/203 |

(Continued)

OTHER PUBLICATIONS

Microsoft, Microsoft Announces New Container Technologies for the Next Generation Cloud, Apr. 8, 2015, http://blogs.technet.com/b/server-cloud/archive/2015/04/08/microsoft-announces-new-container-technologies-for-the-next-generation-cloud.aspx, 2pgs.

(Continued)

*Primary Examiner* — Mohamed A Wasel
*Assistant Examiner* — Binod J Kunwar
(74) *Attorney, Agent, or Firm* — North Weber & Baugh LLP (57) ABSTRACT

Embodiments of the present invention include systems and methods for providing data flow information of a communication end node. The communication end node includes: at least one container including one or more applications; an operating-system-container engine for hosting the container; a host operating system (OS) for hosting the operating-system-container engine; and a socket query engine that is hosted by the operating-system-container engine. The socket query engine causes steps to be performed comprising: monitoring one or more open sockets that allow the one or more applications to communicate data through a network; compiling a list of the one or more open sockets; generating information of data flow that passes through the one or more open sockets using a set of socket parameters of the one or more open sockets; and sending the information of data flow to a controller through the network.

20 Claims, 7 Drawing Sheets

(56) References Cited

U.S. PATENT DOCUMENTS

| | | | |
|---|---|---|---|
| 2012/0047247 A1* | 2/2012 | Piernot | G06F 17/30946 709/224 |
| 2012/0079101 A1* | 3/2012 | Muppala | H04L 43/18 709/224 |
| 2012/0166623 A1* | 6/2012 | Suit | G06F 11/3006 709/224 |
| 2012/0254900 A1* | 10/2012 | Kumar et al. | G06F 11/3476 719/328 |
| 2013/0159999 A1* | 6/2013 | Chiueh | G06F 9/45504 718/1 |
| 2014/0112345 A1* | 4/2014 | Huang | H04L 61/2539 370/392 |
| 2014/0233385 A1* | 8/2014 | Beliveau | H04L 47/122 370/235 |
| 2014/0280838 A1* | 9/2014 | Finn | H04L 49/00 709/223 |
| 2014/0280864 A1* | 9/2014 | Yin | H04L 41/12 709/224 |
| 2014/0317293 A1* | 10/2014 | Shatzkamer | G06F 9/455 709/226 |
| 2015/0026328 A1* | 1/2015 | Tsym | H04L 67/1008 709/223 |
| 2015/0169340 A1* | 6/2015 | Haddad | G06F 9/45533 718/1 |
| 2015/0172300 A1* | 6/2015 | Cochenour | H04L 63/145 726/23 |
| 2015/0188772 A1* | 7/2015 | Gasparakis | H04L 41/12 709/224 |
| 2015/0326660 A1* | 11/2015 | Satterlee | H04L 67/14 709/203 |
| 2016/0050132 A1* | 2/2016 | Zhang | H04L 29/08153 370/252 |
| 2016/0112269 A1* | 4/2016 | Singh | H04L 41/0853 709/224 |
| 2016/0112903 A1* | 4/2016 | Kaushik | H04W 28/0205 370/235 |
| 2016/0210061 A1* | 7/2016 | Soncodi | G06F 3/0605 |
| 2016/0269235 A1* | 9/2016 | Zimmermann | H04L 41/0806 |
| 2016/0330076 A1* | 11/2016 | Tiwari | H04L 41/0806 |
| 2016/0352815 A1* | 12/2016 | Mozolewski | H04L 43/0882 |
| 2016/0380916 A1* | 12/2016 | Gnaneswaran | H04L 47/803 709/224 |

OTHER PUBLICATIONS

Printed from the internet Feb. 2, 2015: URL:https_www.docker.pdf, 3pgs.

* cited by examiner

SOFTWARE-DEFINED-NETWORKING (SDN) ENABLING OPERATING-SYSTEM CONTAINERS FOR REAL-TIME APPLICATION TRAFFIC FLOW IMPROVEMENT

TECHNICAL FIELD

The present invention relates to improving data traffic in a network, more particularly, to systems and methods for controlling data communication of applications using containers in a software-defined-networking (SDN) infrastructure.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
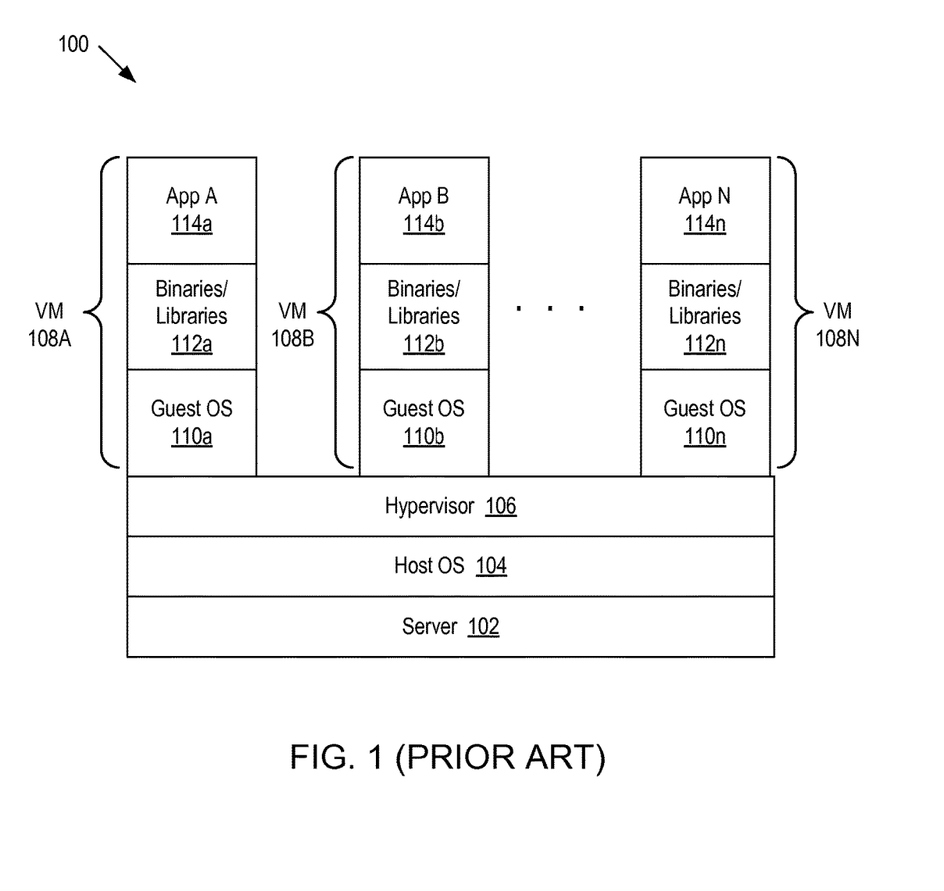
FIG. 1 ("FIG.") shows a schematic diagram of a conventional device having multiple virtual machines.

As an approach to control dynamic allocation of resources, virtualized environments has been introduced. FIG. 1 shows a schematic diagram of a conventional device 100 that enables multiple virtual machines (VMs) 108 to share physical resources. As depicted, the device 100 includes a server 102 that provides a physical computing platform for the host operation system (OS) 104. The VM host server, known as hypervisor 106, hosts one or more VMs 108 so that the VMs can share physical resources, such as CPU and memory, for the virtualized environments and prioritizes their use among all the VMs 108 in the virtualized environments. Each VM 108 includes a guest OS 110, binaries/libraries 112, and an application 114, where the guest OS hosts the application 114 residing in the corresponding VM.

Typically, a new network socket is established when one application communicates data to another application through a network. Thus, as the number of applications 114 increases, the amount of data traffic in a network increases significantly and a proper mechanism to control the data traffic in the network is required. In general, each socket is associated with a file descriptor and the file descriptor includes parameters that may define data flow information of the application. However, in the conventional SDN infrastructures, it is impractical to create an SDN-interface in every Guest OS 110 since it requires significant amount of resources for the applications 114 communicate their data flow information to the central SDN controller. Thus, in a conventional network system, it is still a challenging task to operate an SDN-enabling host OS that allows the central controller to have the global view of data flow information for all of the applications 114.

In the conventional systems, the data flow information is only known to the application itself at the time when the data flow is first described in the file descriptor and remains unknown to the other network devices in the SDN infrastructure until the data is actually communicated through the network. Thus, there is a need for a mechanism that can provide granular flow information for all applications to a SDN controller so that the SDN controller can control the data traffic of the applications in the network early in the life-cycle of the data flow.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components, nodes, or switches within the figures are not intended to be limited to direct connections. Rather, data between these elements may be modified, re-formatted, or otherwise changed by intermediary components. Also, additional or fewer connections may be used. It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; (3) that certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 2A:
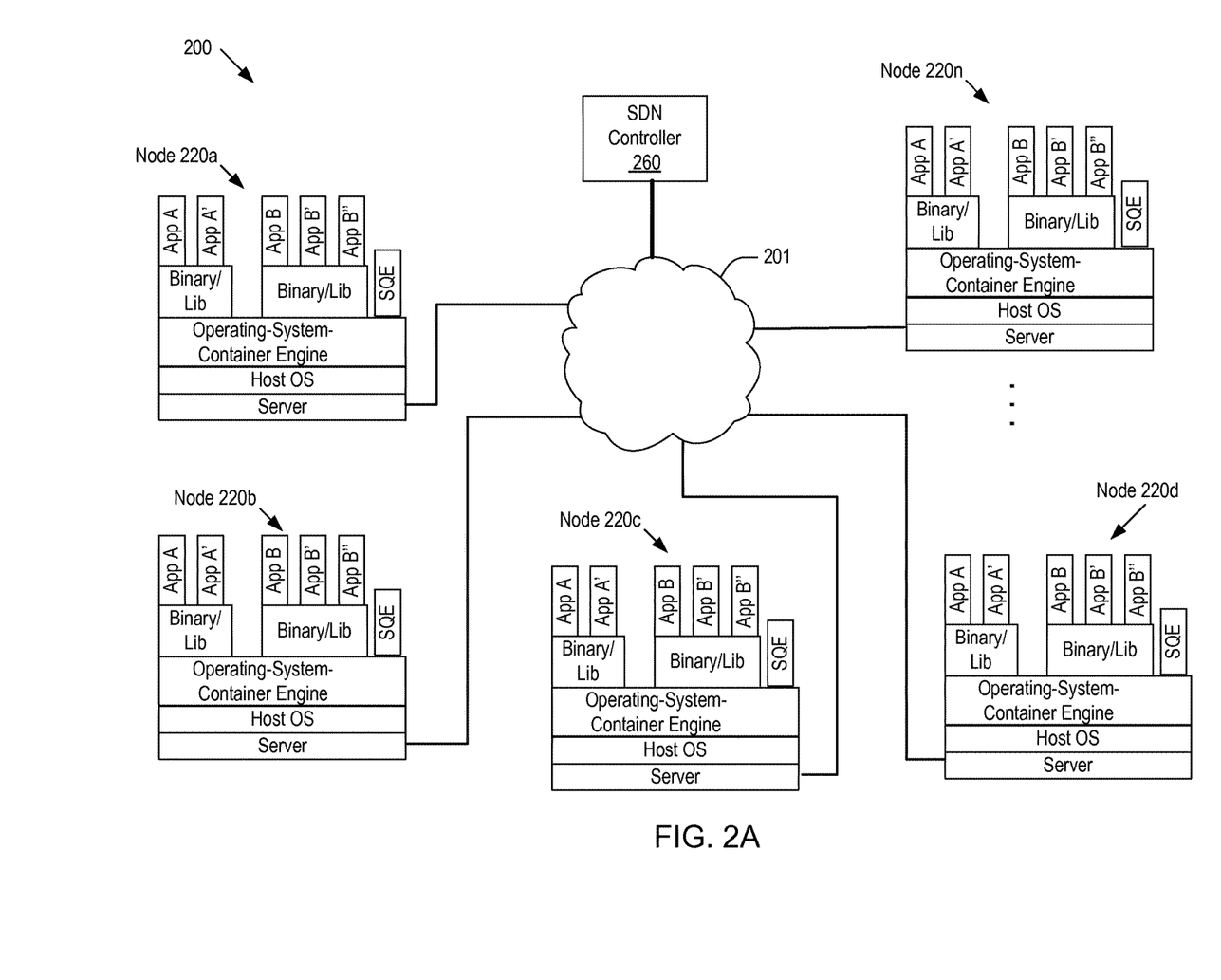
FIG. 2A shows a schematic diagram of a communication system having a software-defined-networking (SDN) infrastructure according to embodiments of the present invention.
Figure 2B:
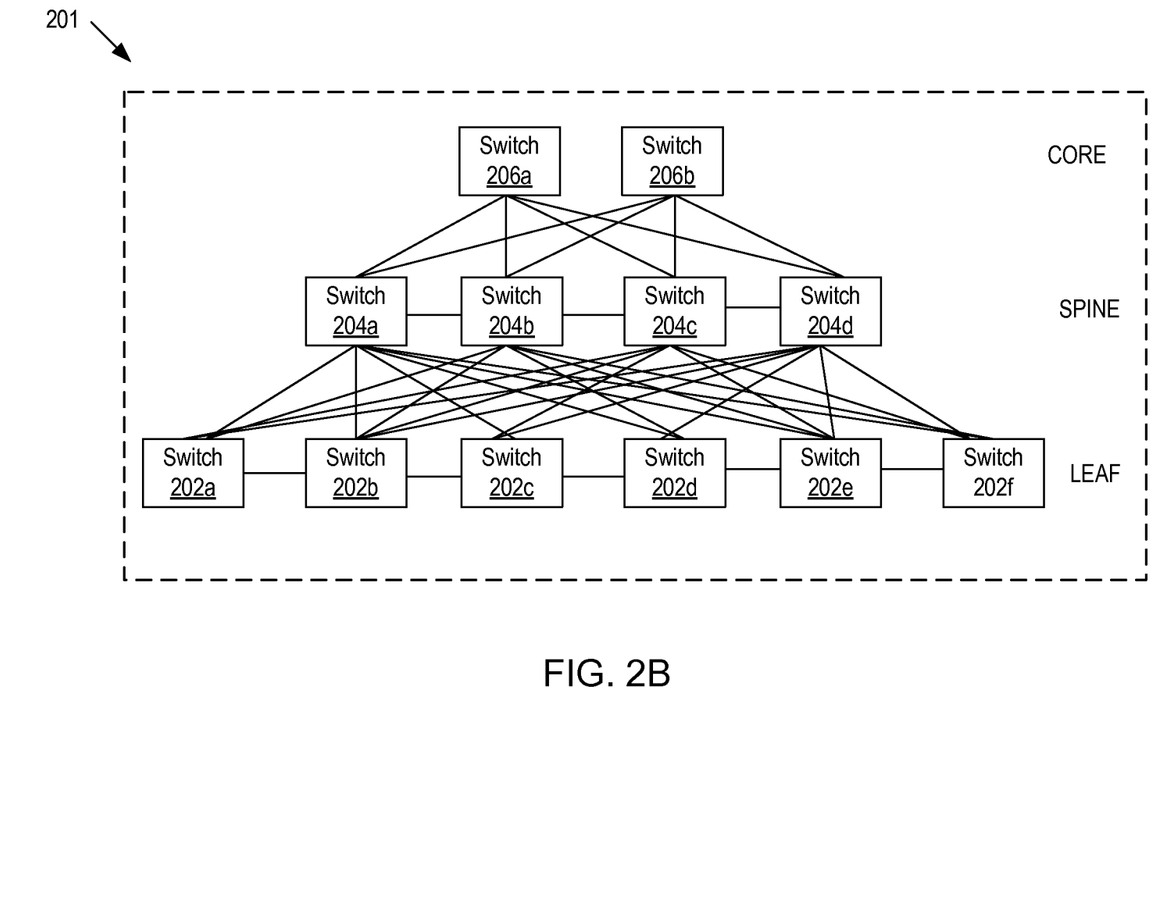
FIG. 2B shows a schematic diagram of the network/cloud in FIG. 2A according to embodiments of the present invention.

FIG. 2A shows a schematic diagram of a system for communication 200 having a software-defined-networking (SDN) infrastructure according to embodiments of the present invention. FIG. 2B shows a schematic diagram of the network/cloud 201 in FIG. 2A according to embodiments of the present invention. As depicted, one or more communication end points (or, shortly nodes hereinafter) 220a-220n may be coupled to each other and a SDN controller 260 for communication through a network/cloud 201. The network/cloud 201 may have a three-layer leaf-spine structure, i.e., the switches 202, 204, and 206 are arranged in three layers. In FIG. 2B, only six leaf switches 202, four spine switches 204, and two core switches 206 are shown. However, it should be apparent to those of ordinary skill in the art that other suitable number of layers may be included in the network/cloud 201 and that other suitable number of switches may be included in each layer. Also, it should be apparent to those of ordinary skill in the art that the network/cloud 201 may have other types of network topologies. It is further noted that any other suitable communication devices may be used in place of the switches in the network/cloud 201.

For the purpose of illustration, the controller 260 is assumed to be a software-define-networking (SDN) controller. However, it should be apparent to those of ordinary skill in the art that the controller 260 may be any type of controller that can perform the functions described in conjunction with FIGS. 3-5.

Figure 3:
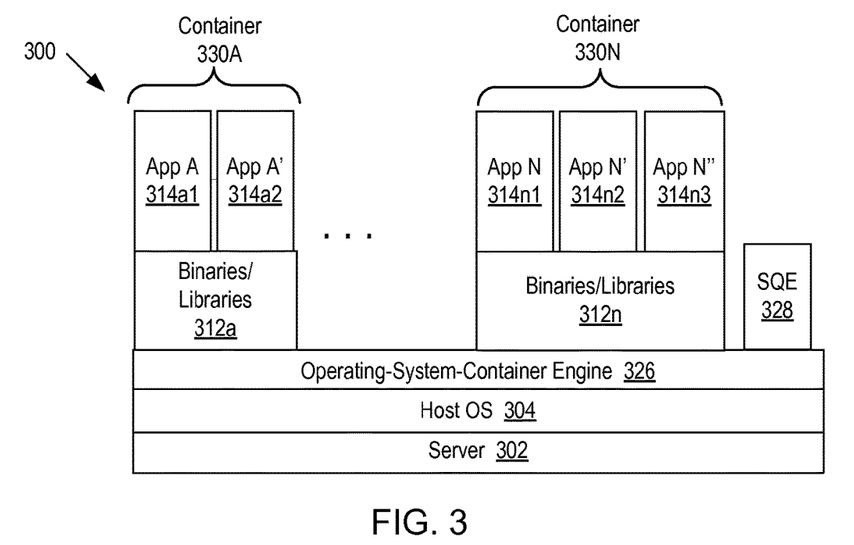
FIG. 3 shows a schematic diagram of an end node in FIG. 2 according to embodiments of the present invention.

Each node 220 may be any suitable device, such as server, a computer, a data center, or any other computing device that can communicate data to other node. FIG. 3 shows a schematic diagram 300 of a node in FIG. 2A according to embodiments of the present invention. As depicted, the node 300 may include a server 302 that provides a physical computing platform for the host operation system (OS) 304. The host OS 304 may host an operating-system-container engine, such as docker engine 326, where the operating-system-container engine 326 may host one or more operating-system-containers, such as docker containers (shortly, containers) 330. In embodiments, each container (e.g., 330a) includes one or more applications 314 (e.g., 314a1 and 314a2) that share the same binaries/libraries 312 (e.g., 312a). The containers 330 may share physical resources, such as CPU and memory, of the server, where the host OS 304 may prioritize their use among all the containers 330 in the node 300.

In embodiments, the operating-system-container engine 326 may provide a platform for users to build, ship, and run the applications 314. In embodiments, unlike the VMs 108 that each have a guest OS 110 (which may weigh tens of GB), each container 330 includes one or more applications 314 and its dependencies 312 only. In embodiments, the operating-system-container engine 326 may run as an isolated process on the host OS 304.

An application 314 in one node (e.g., 220a), may open a new socket for communication with another application(s) installed in the other node, (e.g., 220b). In embodiments, when a network socket is opened, the host OS 304 may assign parameters to a file descriptor for the socket. For instance, the socket may use TCP/UDP as the communication protocol and the parameters in the file descriptor may include source IP (SRC_IP) address, destination IP (DEST_IP) address, SCR_TCP/UDP_PORT, DEST_TCP/UDP_PORT, and Ethernet type (Ether_TYPE). Hereinafter, the term socket parameter refers to a parameter included in a file descriptor and/or in the corresponding socket. In embodiments, certain parameters, such as media-access-control address of the source (SRC-MAC), associated with a new socket may not be assigned by the host OS 304, even though, they may be known to the host OS 304. It is noted that the file descriptor may include other suitable parameters.

Figure 4:
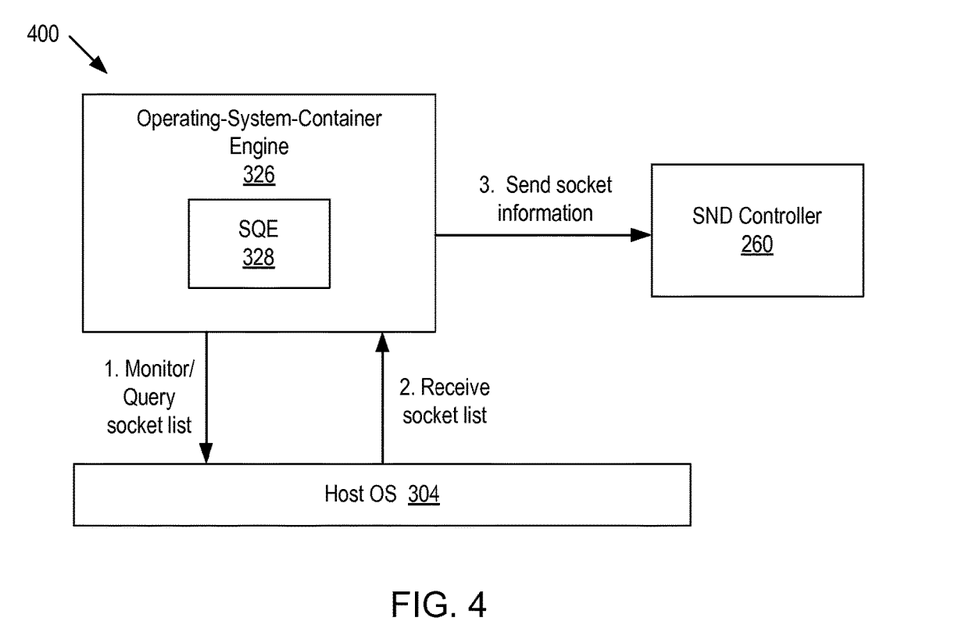
FIG. 4 shows a schematic operational block diagram of an operating-system-container engine according to embodiments of the present invention.

In embodiments, the operating-system-container engine 326 may include a socket query engine (SQE) 328, where the SQE 328 may listen to or query socket calls in the host OS 304 and maintain a list of file descriptors along with the parameters assigned to the file descriptors. FIG. 4 shows a schematic operational block diagram 400 of the operating-system-container engine 326 according to embodiments of the present invention. As depicted, in embodiments, the SQE 328 may monitor new sockets that are open by the applications 314. In embodiments, the SQE 328 may query the list of open sockets (or socket calls) in the host OS 304. In embodiments, the SQE 328 may monitor/query the list periodically. In another embodiment, when the SQE 328 may receive a new socket information from the host OS 304, it may update the list of sockets.

In response to the query, the host OS 304 may provide the information of open sockets to the SQE 328. Then, the SQE 326 may compile/maintain the list of the open sockets and the file descriptors along with the parameters assigned to the file descriptors. Then, based on the parameters of the file descriptors, the SQE 326 may generate data flow information of the node 300 in a format that the SDN controller 260 may accept, and send the data traffic information to the SDN controller 260.

In embodiments, as depicted in FIG. 4, the SQE 328 may be included in the operating-system-container engine 326. In embodiments, as depicted in FIG. 3, the SQE 328 may be hosted by the operating-system-container engine 326. Thus, the terms operating-system-container engine and SQE are used interchangeably hereinafter.

Figure 5:
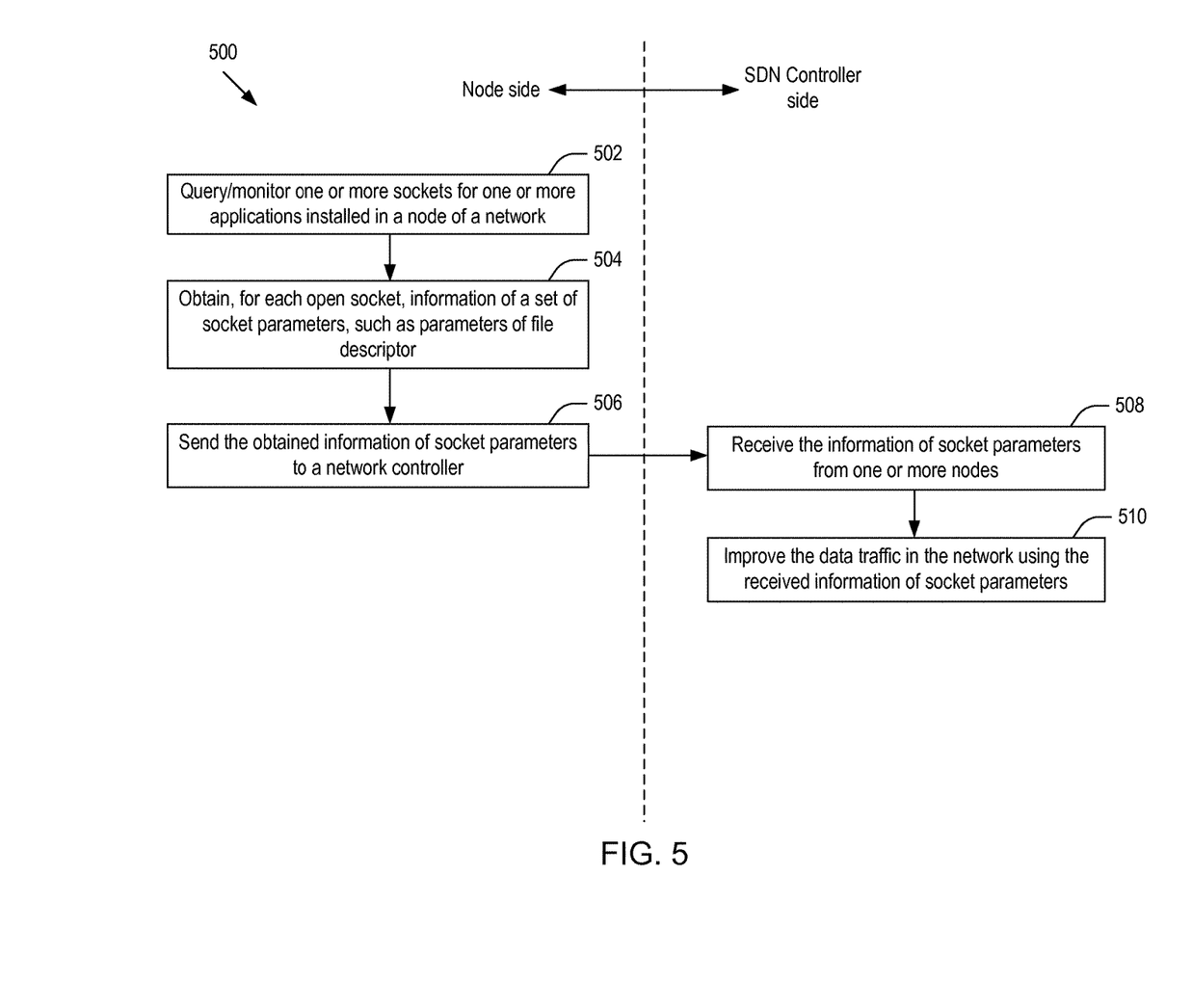
FIG. 5 shows a flowchart of an illustrative process for improving data traffic in a network according to embodiments of the present invention.

FIG. 5 shows a flowchart 500 of an illustrative process for optimizing data traffic in a network according to embodiments of the present invention. As depicted, the steps 502, 504 and 506 may be performed by the SQE 328 of an end device 220, while the steps 508 and 510 may be performed by the SDN controller 260. The process 500 starts at step 502. At step 502, the SQE 328 (or operating-system-container engine 326), may monitor if a new socket is open or query one or more open sockets for the one or more applications 314 installed in a node 220. Then, at step 504, the SQE 328 may obtain, for each open socket, information of a set of socket parameters, such as parameters of the file descriptor. In one embodiment, the SQE 328 may receive and update the socket parameters each time a new socket is open and monitored. In another embodiment, the SQE 328 may periodically query the information of socket parameters to the host OS 304. At step 506, the SQE 328 may send the obtained information of socket parameters to the SDN controller 260. In embodiment, the data flow information may be in a format that the SDN controller 260 may accept. At step 508, the SDN controller 260 may receive the information of socket parameters from one or more nodes 220. Then, at step 510, the SND controller 260 may improve the data traffic between the nodes 220 using the received information of socket parameters.

It is noted that, in embodiments, the operating-system-container engines 326 of the nodes 220 may communicate with the SDN controller 260 and provide the SDN controller 260 with granular flow information in real time so that the SDN controller 260 may have a global view of the open sockets and data traffic through the network. As discussed above, in the conventional systems, the data flow information is only known to the application itself at the time when the data flow is first described in the file descriptor and remains unknown to the other network devices (such as switches/routers) in the SDN infrastructure until the data is actually communicated through the network. In embodiments, unlike in the convention systems, the operating-system-container engine 326 provides a global view of data flow for all applications and sockets so that the SDN controller 260 can control the data traffic in the network early in the life-cycle of the data flow, i.e., the SND controller 260 can improve the data traffic in the network before the applications 314 actually start communicating the data. In embodiments, using the global view of the data flow, the SDN controller 260 is able to predict the data traffic in the network and distribute the data traffic throughout the network to thereby enhance the speed and efficiency of data traffic through the network.

For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
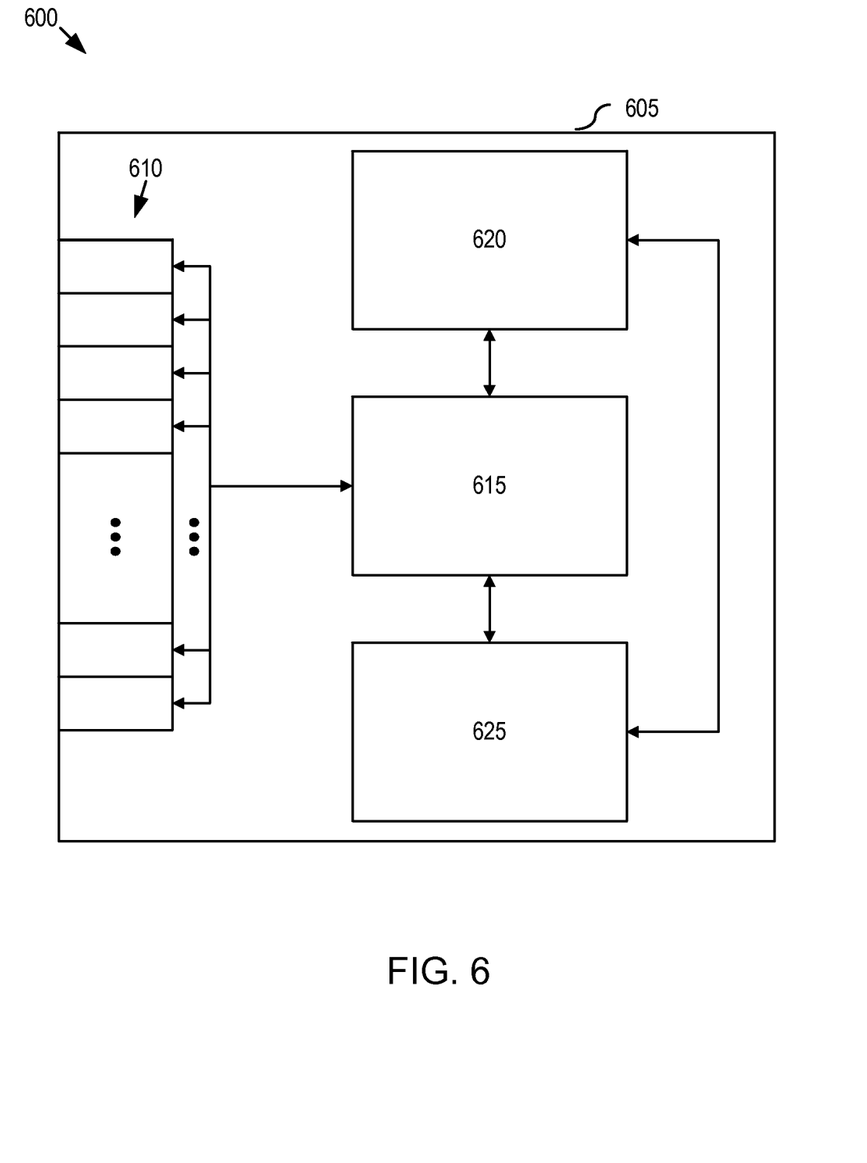
FIG. 6 shows an information handling system according to embodiments of the present invention.

FIG. 6 depicts a simplified block diagram of an information handling system 600 according to embodiments of the present invention. It will be understood that the functionalities shown for device 605 may operate to support various embodiments of an information handling system (or node)—although it shall be understood that an information handling system may be differently configured and include different components. The device 605 may include a plurality of I/O ports 610, a network processing unit (NPU) 615, one or more tables 620, and a central processing unit (CPU) 625. The system includes a power supply (not shown) and may also include other components, which are not shown for sake of simplicity.

In embodiments, the I/O ports 610 may be connected via one or more cables to one or more other network devices or clients. The network processing unit (NPU) 615 may use information included in the network data received at the device 605, as well as information stored in the tables 620, to identify a next hop for the network data, among other possible activities. In embodiments, a switching fabric then schedules the network data for propagation through the device to an egress port for transmission to the next hop.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A communication end node for providing data flow information and coupled to a network, comprising:
one or more processors;
one or more ports communicatively coupled to the network and the one or more processors; and
an engine communicatively coupled to the one or more processors and configured to perform the steps of:
monitoring one or more open sockets that allow one or more applications included in one or more containers that are installed in the communication end node to communicate data through the network, the engine being different from the one or more applications and each container of the one or more containers does not require its own guest operating system;
obtaining, for each open socket, information of a set of socket parameters from a host operating system of the communication end node; and
sending the obtained information to a network controller via the one or more ports, the network controller using the obtained information to control data traffic in the network.

2. The communication end node of claim 1, wherein the step of monitoring one or more open sockets includes:
querying the information of a set of socket parameters to the host operating system (OS) of the communication end node.

3. The communication end node of claim 1, wherein the step of monitoring one or more open sockets includes:
responsive to opening a new socket, receiving the information of a set of socket parameters from the host operating system (OS) of the communication end node.

4. The communication end node of claim 1, wherein the engine is hosted by an operating-system-container engine that is installed in the communication end node.

5. The communication end node of claim 4, wherein the operating-system-container engine is hosted by the host operating system of the communication end node.

6. The communication end node of claim 4, wherein a set of the one or more applications is installed in a container and the container is hosted by the operating-system-container engine.

7. The communication end node of claim 1, wherein the set of socket parameters is included in a file descriptor assigned to a corresponding socket.

8. The communication end node of claim 1, wherein the set of socket parameters includes one or more of a source internet protocol (IP) address, a destination IP address, a destination port, a source port, and an Ethernet type.

9. The communication end node of claim 1, wherein the network has a software-defined-networking (SDN) infrastructure.

10. A communication end node coupled to a network for communication, comprising:
a server comprising:
at least one container including one or more applications;
an operating-system-container engine for hosting the at least one container;
a host operating system (OS) for hosting the operating-system-container engine and installed in the server;
an engine that is hosted by the operating-system-container engine and causes steps to be performed comprising:
monitoring one or more open sockets that allow one or more applications included in one or more containers that are installed in the communication end node to communicate data through the network, the engine being different from the one or more applications and each container of the one or more containers does not require its own guest operating system;
obtaining, for each open socket, information of a set of socket parameters from the host OS; and
sending the obtained information to a network controller, the network controller using the obtained information to control data traffic in the network.

11. A communication end node as recited in claim 10, wherein the engine queries the information of a set of socket parameters to the host OS and the host OS sends the information of a set of socket parameters to the engine.

12. A communication end node as recited in claim 10, wherein, responsive to opening a new socket, the engine receives information of the new socket from the host OS.

13. A communication end node as recited in claim 10, wherein the network has a software-defined-networking (SDN) infrastructure.

14. A communication end node as recited in claim 10, wherein the set of socket parameters includes one or more of a source internet protocol (IP) address, a destination IP address, a destination port, a source port, and an Ethernet type.

15. A computer-implemented method for providing data flow information of a communication end node coupled to a network, the communication end node having an engine and one or more containers that included one or more applications and that each container of the one or more containers does not require its own guest operating system, the one or more applications are different from the engine and open one or more open sockets for communicating data through the network, the method comprising:
causing the engine to receive, for each open socket, information of a set of socket parameters from a host operating system (OS) of the communication end node; and
sending the received information of a set of socket parameters to a network controller through the network, the controller using the gathered information to control data traffic in the network.

16. A computer-implemented method as recited in claim 15, further comprising:
causing the engine to query the information of a set of socket parameters to the host operating system (OS) of the communication end node.

17. A computer-implemented method as recited in claim 15, further comprising:
responsive to opening a new socket, causing the engine to receive the information of a set of socket parameters of the new socket from the host operating system (OS) of the communication end node.

18. A computer-implemented method as recited in claim 15, wherein the engine is hosted by an operating-system-container engine installed in the communication end node.

19. A computer-implemented method as recited in claim 18, wherein the operating-system-container engine is hosted by the host operating system of the communication end node.

20. A computer-implemented method as recited in claim 15, wherein the set of socket parameters includes one or more of a source internet protocol (IP) address, a destination IP address, a destination port, a source port, and an Ethernet type.

* * * * *